S. W. FLESHEIM.
METHOD FOR BONDING CONCRETE.
APPLICATION FILED MAY 29, 1913.
Reissued July 22, 1913.
13,598.
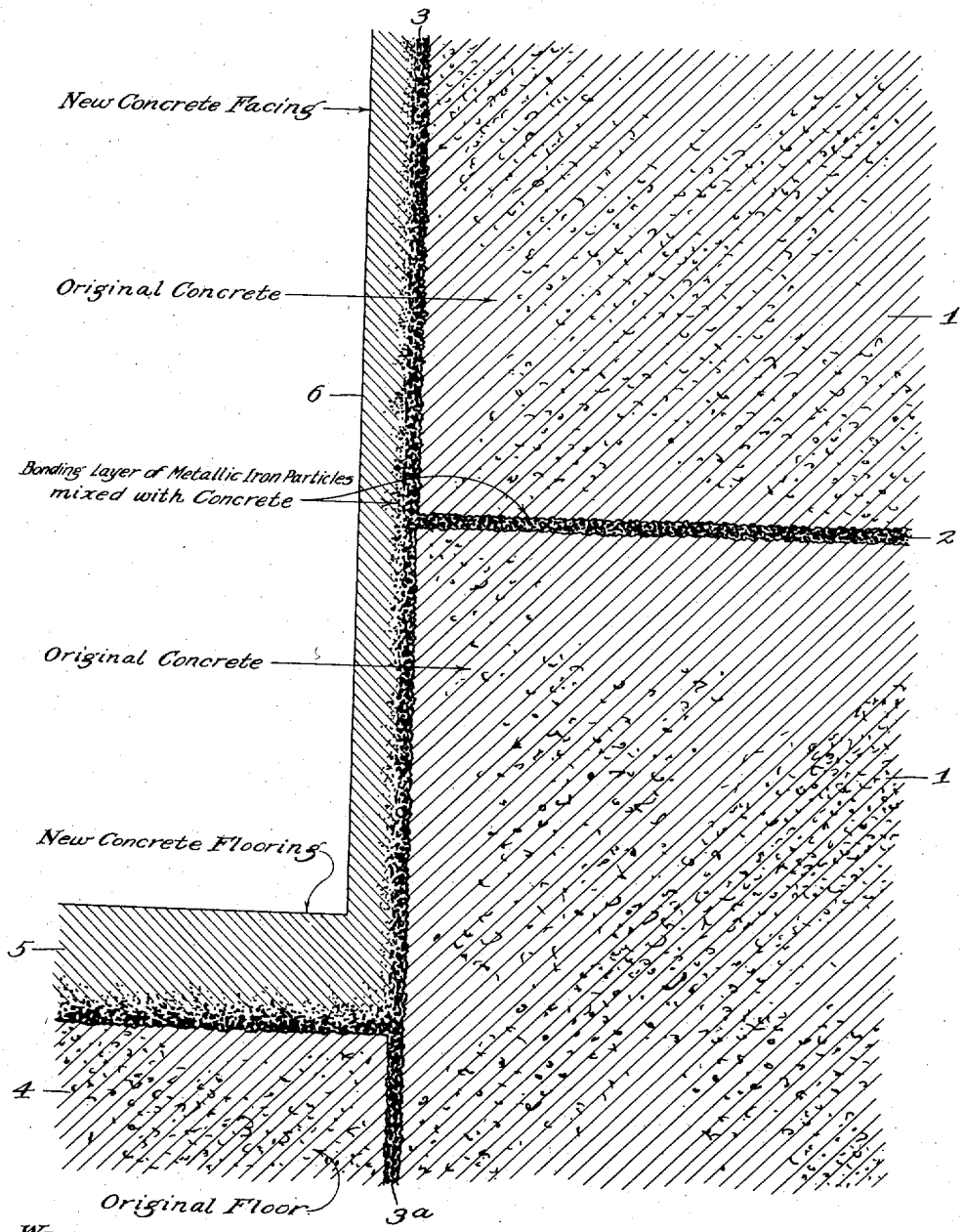
WITNESSES:
Foreman R. West
R. L. Bruck
INVENTOR,
Sylvester W. Flesheim
BY Hull & Smith
ATTYS.

UNITED STATES PATENT OFFICE.

SYLVESTER W. FLESHEIM, OF CLEVELAND, OHIO, ASSIGNOR TO THE MASTER BUILDERS COMPANY, OF CLEVELAND, OHIO, A CORPORATION OF OHIO.

METHOD FOR BONDING CONCRETE.

13,598. Specification of Reissued Letters Patent. Reissued July 22, 1913.

Original No. 1,012,832, dated December 26, 1911, Serial No. 634,028. Application for reissue filed May 29, 1913. Serial No. 770,779.

*To all whom it may concern:*

Be it known that I, SYLVESTER W. FLESHEIM, a citizen of the United States, residing in Cleveland, in the county of Cuyahoga and State of Ohio, have invented or discovered a certain new and useful Method for Bonding Concrete, of which the following is a full, clear, and exact description, reference being had to the accompanying drawings.

This invention relates to cement or concrete structures and has for its object the production of a process whereby a new cement or concrete structure can be economically and permanently affixed to a previously existent structure or mass of the same or other porous material.

It is frequently necessary in building or altering operations to build a new cement wall or facing upon a mass of concrete which has already hardened and perhaps been worn by traffic or eroded by the weather. An instance of this condition is the laying of a new concrete flooring upon a concrete floor which has already become hardened and set. Heretofore it has always been necessary to break or chisel away a considerable amount of the old structure, both for the purpose of producing a rough and uneven surface upon which the fresh concrete can become bonded, and to render the thickness of such new coating sufficiently great to prevent its peeling away by reason of its contraction, or its being broken up by blows and shocks.

The object of this invention is the production of a process of treating the surface of an old structure so that newly laid cement will be firmly and permanently affixed thereto, even though the thickness of the new coating be comparatively slight, thus markedly cheapening and facilitating the operation of resurfacing or adding to the previous structure.

It is a well known fact that neat cement when mixed with water and laid upon such a floor will shrink in setting to such an extent as to break into irregular patches which peel upwardly at their edges; also that a slab of concrete in which the proportion of cement is at all high expands and contracts very markedly upon changes in moisture. To overcome this contraction it has long been customary to mix the cement with a large percentage of sand, "clean, sharp sand" being ordinarily specified, thereby meaning sand whose edges are not dulled by attrition. When the sand and cement are mixed with water the cement forms a pasty matrix which surrounds and embraces the sand grains and ultimately, upon hydration, crystallizes therearound. The cement medium then forms a binder and the sand grains a filler. Even in the case of "sharp" sand, however, the faces of the grains are smooth and glassy because of the characteristic quartz fracture, only the edges between faces being irregular or pointed. Obviously the crystals of hydrated cement will adhere very weakly to these glassy surfaces, being securely anchored only to the corners and edges of the grains, wherefore the tensile strength of the mixture is greatly decreased by the sand, the latter being tolerated only because it diminishes the contractile tendency of the structure and prevents it from cracking and breaking as it sets (incidentally cheapening the construction by adulteration). Another difficulty with sand is that the finer particles are almost always much smoother than coarse particles, wherefore a fine sand is entirely useless for admixture with cement, as the resulting concrete is so weak as to be worthless.

In cases where a surface layer of cement concrete or a new structure of that material is to be applied to a previously made and hardened structure of the same or of other porous lapideous material, it has been proposed to apply to the surface of the existing structure a coating of pure cement and water, but this, while very effective for small surfaces such as the cross sectional area of a test-briquet, is useless over a larger area owing to the breakage of the bond upon the contraction of the cement due to its hydration. I have discovered that by mixing this cement with finely comminuted particles having an irregular outline and a hackly fracture, like finely divided cast iron borings, suitably screened to a reasonably uniform size, the breaking of the bond by reason of the contraction of the cement is almost entirely obviated so that even upon very large surfaces the loosening of the surface layer is very rare. It is certain that the strength of the bond is much greater than when sand is employed and I ascribe this effect to the greater roughness and irregularity of the metal grains which causes the cement crystals to adhere thereto much more firmly than to the smoother sand grains.

The surfacing layer may consist of cement and sand mixed up with water and applied in the usual or any convenient manner, the only requirement being that this layer be applied before the first coating has an opportunity to harden, dry or set. The intermediate or bonding coat forms a kind of transition layer which takes up the strains of setting, expanding, contracting, etc., and maintains a permanent bond between the original wall and the newly applied surface or structure.

Metallic grains may, if desired, be mixed with the material of the surfacing layer, and I prefer, in fact, to employ the same for the smallest particles of the filler owing to the fact that their surfaces are so much more irregular than the surfaces of sand grains of equivalent size. As far as the bonding effect is concerned it is apparently not important whether any of this material is employed in this surface or "plaster" coat, or whether the same consists only of sand, cement, and water in proper proportions.

Iron being of an electro-positive character as compared with cement, and cement being of an alkaline nature no extensive oxidation of the iron particles takes place even after long periods of time and even if the structure be subiected to the action of water. In the interior of the mass no appreciable oxidation or rusting of the particles is observable even after long times, this being apparently due partly to the alkaline character of the mixture and partly to the mechanical inclosure of the metallic grains by the cement, whereby oxygen is kept away. It has been suggested to produce oxidation of these grains for some purposes by the addition of ammonium chlorid, but this does not appear to have any appreciable effect upon the metal. The use of this chemical gives rise to a strong ammoniacal smell, but my tests have shown that the ammonium chlorid expended its strength upon the lime in the cement rather than upon the iron leaving the latter entirely or substantially untouched. Accordingly I have decided that it is as well to omit the use of sal-ammoniac. Furthermore, I find that oxidation has a deleterious effect and should be avoided.

In the practice of my process I preferably employ a mixture of finely divided metallic iron and pulverized fresh cement in substantially equal parts by weight. This mixture is wet up with water as needed to the consistency of a thin paste and spread upon the old structure in a thin layer, perhaps one-sixteenth inch thick. The new coating is then applied in the usual way either by pouring or by troweling as may be most convenient, care being taken to apply the same before the first or "slush" coating has had a chance to set. This slush coat is usually made rather thin in order to save expense. The proportions above named are not invariable but may be departed from considerably without losing all of the benefits of my process.

In case a floor is being resurfaced, it is best to mix the sand and cement with a small percentage of the same finely divided particles, since these by forming the smallest particles of the filling material, produce a harder and more compact concrete. The operation of the slush coating is exactly the same whether or not the following or "plaster" coat be thus treated. It is preferable, in fact, to employ a small admixture of the iron particles in the second or "plaster" coating in all cases in which this coating is to be of small thickness, since the presence of the irregular iron particles largely prevents the shrinkage of the mixture upon setting and drying, and so diminishes its tendency to curl up and peel away from the surface to which it is applied.

The drawing accompanying and forming a part of this application illustrates the application of this method of bonding cement. This drawing illustrates a portion of a concrete floor and of a wall built up in sections, the sections being bonded together with a slush coating and the floor and wall being covered with a facing layer or "plaster coat" of cementitious material bonded thereto in accordance with my invention. The sections of the wall are shown at 1, the slush coat therebetween at 2, the slush coat between the wall and the plaster coat at 3, the original concrete floor at 4, the floor topping at 5, and the wall facing at 6. The original floor 4 is supposed to have been laid after the building of the side wall according to the usual practice and to have been bonded thereto in accordance with my invention by means of a slush coat at 3a.

While I have specified iron as the material which I prefer to use, it may be that other grains could be employed although I have been unable to find anything else that would serve acceptably at a price which would render it commercially feasible. Cast iron being brittle can easily be obtained in the finely divided form necessary and the particles naturally have the irregular, hackly or jagged surfaces which cause them to becom firmly attached to the cement. Brass fillings, besides being expensive, corrode very rapidly in contact with cement owing to the alkaline character of the latter and the electro-negative character of the zinc. Copper or nickel, besides being expensive, are too tough to pulverize although their electro-positive character precludes their oxidizing.

The only real drawback to the use of iron is its tendency to oxidize, but this tendency is so fully overcome by the alkalinity of the cement and the exclusion of the air by the cement which surrounds them that little or no rusting is observable even after the lapse of extended periods.

Having thus described my invention, what I claim is:

1. The process of surfacing with new concrete an already existent porous structure which consists in applying to the surface of the latter structure a coating of cement and finely comminuted irregular metallic particles mixed up with water to a consistency of a thin dough or slush, and applying to the surface of such coating in advance of its drying or hardening a new layer of cement, sand, and water, whereby said first coating and said succeeding layer may set and harden simultaneously and said metallic particles may diminish the expansion and contraction of said first coating.

2. The process of bonding together two porous cementitious structures which consists in interposing therebetween a mixture of cement, finely-divided, irregular-surfaced, metallic particles and water whereby the expanding and contracting tendency of the cement is overcome without impairing its adhesive qualities.

3. The process of surfacing with new concrete an already existent concrete structure which consists in applying to the surface of the latter structure a watery paste containing cement and finely comminuted particles of brittle metal, said metal being electropositive with reference to cement, and applying to the surface of said first coating in advance of its drying or hardening a layer of cement and sand mixed with water, whereby said metallic particles will be covered and inclosed with cement and will diminish the expanding and contracting tendency thereof.

4. The process of resurfacing an already existing cement-concrete structure which consists in applying to the surface of such structure a pasty coating of cement and finely divided particles of cast iron mixed with water, and thereafter applying to said coating in advance of the drying or hardening thereof a layer of cement, sand, and finely divided particles of cast iron mixed with water, whereby both said first coating and said succeeding layer may harden and set together and the shrinkage of the cement may be diminished.

In testimony whereof, I hereunto affix my signature in the presence of two witnesses.

SYLVESTER W. FLESHEIM.

Witnesses:
F. A. Bertsch,
Harold E. Smith.

Copies of this patent may be obtained for five cents each, by addressing the "Commissioner of Patents, Washington, D. C."